(12) United States Patent
Yeh et al.

(10) Patent No.: US 6,567,604 B1
(45) Date of Patent: May 20, 2003

(54) INDIUM PLATED PACKAGE FOR AN OPTICAL COMPONENT AND PROCESS THEREFORE

(75) Inventors: Hsin-chih Yeh, San Diego, CA (US); Susant Patra, Poway, CA (US)

(73) Assignee: OMM, Inc., San Diego, CA (US)

( * ) Notice: Subject to any disclaimer, the term of this patent is extended or adjusted under 35 U.S.C. 154(b) by 0 days.

(21) Appl. No.: 09/697,766

(22) Filed: Oct. 25, 2000

(51) Int. Cl.$^7$ .................................................. G02B 6/00
(52) U.S. Cl. ........................ 385/138; 385/134; 385/139
(58) Field of Search ................. 385/133–138, 385/139

(56) References Cited

U.S. PATENT DOCUMENTS

| | | | | |
|---|---|---|---|---|
| 4,119,363 A | * | 10/1978 | Camlibel et al. | 385/84 |
| 4,321,617 A | | 3/1982 | Duda et al. | 357/71 |
| 4,778,241 A | | 10/1988 | Haltenorth | 350/96.2 |
| 4,944,569 A | | 7/1990 | Boudreau et al. | 350/96.2 |
| 5,026,138 A | | 6/1991 | Boudreau et al. | 350/96.2 |
| 5,253,321 A | * | 10/1993 | Long et al. | 385/138 |
| 5,325,456 A | * | 6/1994 | Cullen et al. | 385/138 |
| 5,568,585 A | * | 10/1996 | Kramer | 385/139 |
| 5,602,955 A | | 2/1997 | Haake | 385/136 |
| 5,664,043 A | * | 9/1997 | Donaldson et al. | 385/138 |
| 5,692,086 A | | 11/1997 | Beranek et al. | 385/94 |
| 5,745,624 A | | 4/1998 | Chan et al. | 385/91 |
| 5,757,987 A | * | 5/1998 | Presby | 385/7 |
| 6,164,837 A | | 12/2000 | Haake et al. | 385/90 |
| 2002/0037144 A1 | * | 3/2002 | Gobbi et al. | 385/94 |

FOREIGN PATENT DOCUMENTS

WO  WO 00/41021  7/2000

OTHER PUBLICATIONS

Micromirror arrays fabricated by flip–chip assembly, Michalicek et al., Sep. 1999, SPIE vol. 3878, pp. 68–79.

* cited by examiner

Primary Examiner—Brian Sircus
Assistant Examiner—Michael C. Zarroli
(74) Attorney, Agent, or Firm—Aagaard & Balzan, LL; Arien Ferrell

(57) ABSTRACT

A device capable of receiving an optical fiber through an orifice in the housing of the device. The housing having a gold surface over a substrate material. An indium layer is located on the gold surface. A solder joint is formed with the indium layer covering the gold surface to have indium silver solder surrounding the fiber and maintaining the fiber in a desired position with the housing. The indium layer can be formed of pure indium and the solder joint is formed of indium silver solder having about 97% indium and about 3% silver. The fiber or fibers may be metallized with a pure indium coating. The indium silver solder joint can provide an improved hermetic seal at fiber entrances and exits of the device.

60 Claims, 3 Drawing Sheets

INDIUM PLATED PACKAGE FOR AN OPTICAL COMPONENT AND PROCESS THEREFORE

BACKGROUND

Microelectromechanical systems or MEMS have electromechanical structures typically sized on a millimeter scale or smaller. These structures are used in a wide variety of applications including for example, sensing, electrical and optical switching, and micron scale (or smaller) machinery, such as robotics and motors. MEMS devices are very sensitive to environmental exposure. As such, MEMS structures are encased in hermetically sealed packages.

In the case of optomechanical switches and other optocoupling devices, optical fibers must enter the package without allowing the interior of the package to be exposed to the environment. This includes possible exposure through any space that may exist between the optical fiber and the sleeving that surrounds the fiber. To prevent this, the sleeving typically is removed and the fiber sealed with a sealing material at an orifice to the package.

The hermetic seal is of particular concern in optomechanical devices. This is because any surface contaminants on the devices can affect mechanic properties, including increasing stiction; can affect optical properties, including reducing the reflectance of optical structures; and can affect electromagnetic interactions. These concerns are in addition to the typical concerns over exposure of electrical components to the environment. Thus, in optomechanical devices, a robust hermetic sealing is of particular importance.

The packages typically are formed of a nickel iron compound plated with a gold exterior layer. A nickel layer can be plated on the nickel iron compound to facilitate adhesion of the gold to the package.

Typically, a solder process is used to hermetically seal the package. One example of such a process is disclosed in U.S. Pat. No. 5,692,086, by Beranek et al., entitled OPTICAL FIBER LOCKING SUBMOUNT AND HERMETIC FEEDTHROUGH ASSEMBLY, issued Nov. 25, 1997, herein incorporated by reference in its entirety. Difficulties with conventional solder processes include fiber degradation caused by higher temperatures of such processes.

Therefore, what is needed is a low temperature solder process which provides a robust hermetic seal and favorable device performance and yields.

SUMMARY

In a possible implementation in accordance with the present invention, a device is provided capable of receiving an optical fiber through an orifice in the housing of the device. The housing has a gold surface over a substrate material. An indium layer is located on the gold surface. A solder joint is formed with the indium layer covering the gold surface to have indium silver solder surrounding the fiber and maintaining the fiber in a desired position with the housing.

In one embodiment, the indium layer is deposited by electroplating and is formed of pure indium. The solder joint may be formed of indium silver solder having about 97% indium and about 3% silver.

The indium silver solder can have a melting point below that of the indium layer. This allows the indium layer to act as protective barrier over the gold surface, inhibiting the indium silver solder from dissolving the gold surface. The indium layer adheres well to the gold and the indium silver solder, in turn, adheres well to the indium layer.

Further, the indium silver solder adheres well to the gold surface if some or all of the indium is dissolved during the solder process. If part or all of the indium layer is dissolved, the indium silver solder is less reactive when it does contact the gold surface. As a result, indium silver solder reduces the reaction rate with the gold surface if the indium layer is sacrificed or removed by the indium silver solder. The silver in the indium silver solder functions to reduce the reaction of the indium in the solder with the gold surface. Thus, the indium silver solder further inhibits removal of the gold surface even if the solder comes in contact with the gold surface. This is particularly beneficial in situations where the temperature, or the temperature uniformity or gradient, at the solder site is difficult to control precisely.

As a result, compared with a pure indium solder process not employing a gold protection layer such as an indium layer, the combination of the indium layer with the indium silver solder can increase the process window, from about 1–2 minutes to about 10 minutes. In addition, and as a result of a larger process window, the indium silver solder used in conjunction with an indium layer over the gold surface allows for greatly improved production yields with less process constraints.

In a preferred embodiment, the solder joint formed on the indium layer covering the gold surface provides an improved hermetic seal at both the fiber entrances, and exits, of the device.

It is possible in some embodiments to remove an intermediate portion of the fiber sleeve and place the sleeveless portion within the entrance or exit tunnel through the side wall of a device housing where the solder joint will be formed. Removing an intermediate portion of the sleeve conveniently allows the multiple fibers of a ribbon-type cable to be generally maintained in relative alignment during the solder process. It also conveniently allows alignment during an indium fiber/fibers metalization process if applicable.

The fiber or fibers may be metallized with a pure indium coating. The indium metalization provides good wetting with the indium silver solder and adheres well to a glass fiber. If metallized with pure indium, no additional flux is necessary to provide a good solder joint. Similarly, no flux is necessary on a pure indium layer to provide a good solder joint with the interior tunnel surface.

If the metalization layer is formed by stripping and metallizing a bare fiber, preferably the metalization layer does not extend under the sleeving. If such is the case, a sheath, such as epoxy, may be formed to extend over the sleeving, the bare fiber, and onto an adjacent portion of the metallized fiber for strain relief if desired.

As such, in some embodiments, the sheath seals the interface between the sleeving and the metalization layer, and covers the bare portion of the fiber. It also provides rigidity at the interface between the sleeving and the metalization layer to help protect against breakage of the fiber at this interface during cable installation through the housing wall, and during positioning and soldering of the cable.

DESCRIPTION

Figure 1:
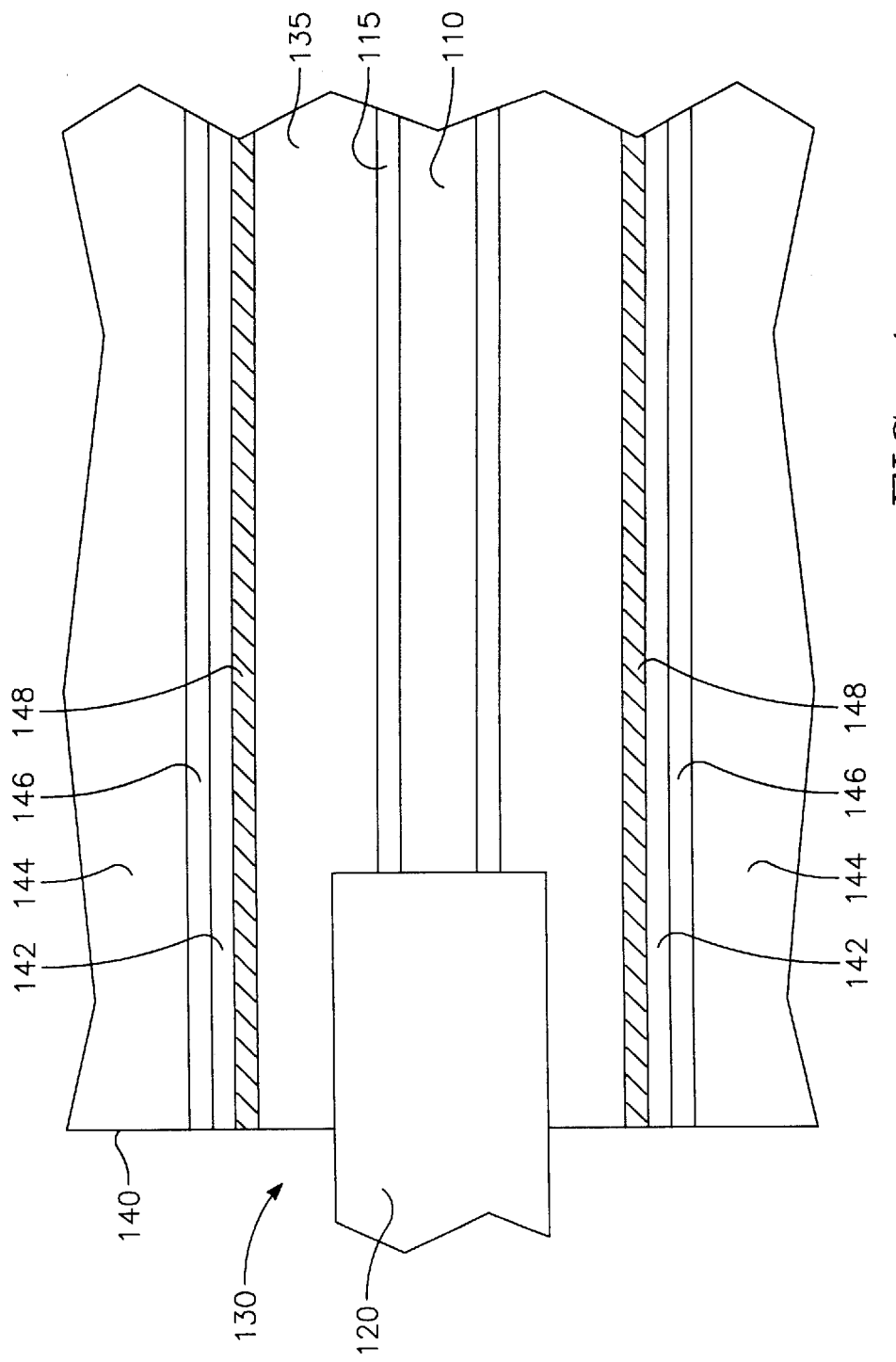
FIG. 1 shows a partial cut away side view of fiber within a walled orifice of a possible embodiment in accordance with the present invention.

FIG. 1 shows a fiber 110 surrounded by a sleeving 120. The fiber extends into an orifice 130 in a wall 140. The orifice 130 has an associated interior orifice surface 135 within the orifice 130. The fiber 110 has a metalization coating 115. A solder joint (not shown) can be formed in the space surrounding the metallized fiber to secure the fiber 110 to the interior orifice surface 135. The orifice 130 and the interior orifice surface 135 may be a ferrule, a tunnel, a channel, a tube, or other such structure, in, or coupled to, a housing wall 140 of a device package (not shown).

The interior orifice surface 135 has a gold surface 142 over a substrate 144. In one embodiment, the substrate 144 is a nickel iron compound. In such an embodiment, a nickel plating layer 146 may be formed over the substrate 144 to facilitate adhesion of the gold surface 142 to the wall 140 as shown in FIG. 1.

Indium solder may be used to form the solder joint (not shown). It has been discovered by the present inventors, however, that unless practiced in a narrow process window, such as one minute or less, the indium solder can dissolve the gold layer 142 during the solder process. This exposes the nickel plating layer 146 to the indium solder, causing oxidation of the nickel, which results in a poor bond with the wall 140. This has been observed to cause yields of about 10% or lower.

Instead, the gold surface 142 of the interior orifice surface 135 is coated with an indium layer 148, and an indium silver solder is used to form the solder joint. Indium silver solder can have a lower melting point than indium, about 148 degrees Celsius in the case of 97% indium 3% silver solder. In contrast, indium has a higher melting point of about 156 degrees Celsius.

The indium silver solder (not shown) should be selected to have a melting point below that of the indium layer 148. As such, the indium silver solder should have a silver content of about 1% to about 5%. This allows the indium layer 148 to act as protective barrier over the gold surface 142. This inhibits the indium silver solder from dissolving the gold surface 142. If the silver content in the indium silver solder is, or becomes too great, the melting point of the indium silver solder can rise above that of the indium layer 148 and reduce the protective benefits provided by the indium layer 148.

The indium layer 148 adheres well to the gold surface 142 and can be plated to about 50–70 microns using an electrolyte solution. The indium silver solder, in turn, adheres well to the indium layer 148, or to the gold surface 142 if some or all of the indium is dissolved during the solder process.

In addition to being inhibited from coming in contact with the gold surface 142, indium silver solder is less reactive if it does contact the gold surface 142. As a result, indium silver solder reduces the reaction rate with the gold surface 142 even if the indium layer 148 is sacrificed or removed by the indium silver solder. The silver in the indium silver solder functions to reduce the reaction of the indium in the solder with the gold surface 142. Thus, the indium silver solder further inhibits removal of the gold surface 142 even if the solder comes in contact with the gold surface 142. This is particularly beneficial in situations where the temperature, or the temperature uniformity or gradient, at the solder site is difficult to precisely control.

As compared to a pure indium solder process without a gold protection layer, the combination of the indium layer 148 with indium silver solder having about 3% silver can increase the process window from about 1–2 minutes to about 10 minutes. In addition, and as a result of a larger process window, the indium silver solder used in conjunction with an indium layer 148 over the gold surface 142 allows for greatly improved production yields with less process constraints.

Figure 2:
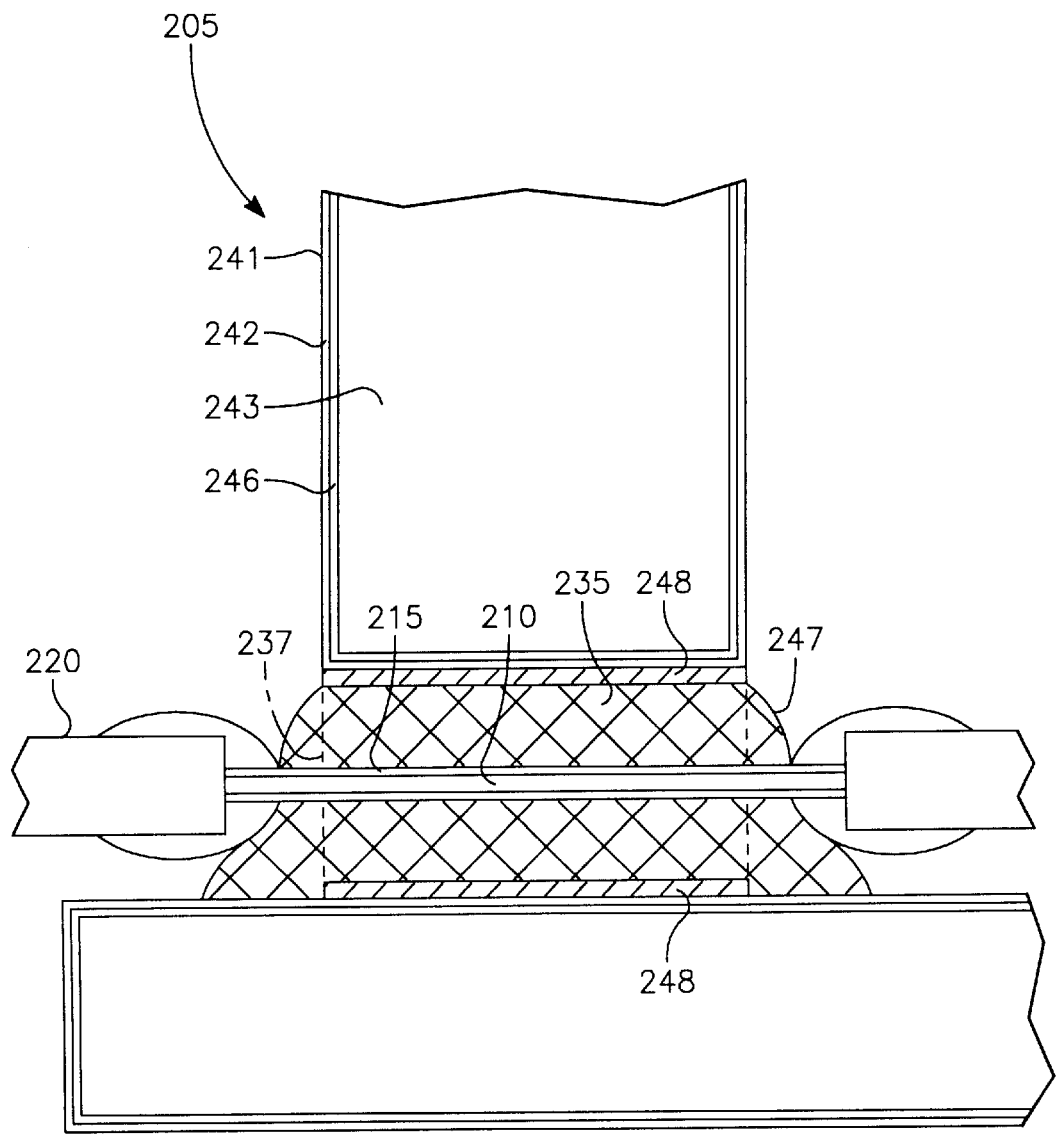
FIG. 2 shows a partial cut away side view of a possible embodiment of a fiber extending through an orifice of a sidewall of a device package in accordance with the present invention.

In one embodiment, as shown in FIG. 2, a NiFe substrate 243, such as 46% NiFe, has a nickel plating layer 246 with an overlying gold surface 242. The gold surface 242 covers the entire housing 205 to provide a relatively non-reactive coating within an interior chamber (not shown) of a device package. A non-reactive interior housing surface is desirable around MEMS devices, and of particular importance in optomechanical MEMS devices, to help ensure proper performance of the device.

In this embodiment, an intermediate portion of the sleeve 220 is removed, and the sleeveless portion placed within a tunnel or a ferrule 237 through a side wall 241 of a device housing 205. Removing an intermediate portion of the sleeve conveniently allows the multiple fibers of a ribbon-type cable to be generally maintained in relative alignment during the solder process. It also conveniently allows alignment during a fiber/fibers metalization process, discussed further below, if the fiber is not pre-metallized.

The fiber or fibers 210 may be metallized with an indium coating 215. The indium metalization 215 provides good wetting with the indium silver solder and adheres well to a glass fiber 210. If metallized with pure indium, no additional flux is necessary to provide a good solder joint. Similarly, no flux is necessary on a pure indium layer 248 to provide a good solder joint with the interior ferrule surface 235.

The indium layer 248 improves the reliability of solder flow application and allows the indium silver solder 247 to be applied by heating a portion of the wall 241 adjacent the ferrule 237 and contacting an indium silver solder wire to a portion of the wall 242 near the ferrule 237. In some embodiments, the size of the ferrule and/or its relationship to the size of the fiber and the sleeving is selected so that surface tension will cause the molten solder to remain substantially within the interior of the orifice.

It is contemplated that fibers could be metallized with other materials such as for example gold, silver, copper, nickel, nickel/gold or the like, or a combination thereof. Indium metalization, however, allows a low temperature fiber metalization process. Indium silver solder has a low Young's Modulus so reduces thermal stressing of the fiber during the metalization process. It also allows the fiber to maintain good optical properties and provides a good solder joint as discussed above.

Further, indium does not require evaporation or sputtering type of processes and machinery for the metalization process. As such, indium metalization can allow higher throughput and require fewer process steps than other metalization processes. If silver is used, the silver content of the indium silver solder should be selected so that any silver added to the solder from the metalization layer, or any other source, does not cause the solder melting point to rise above that of the indium layer.

Furthermore, it is contemplated that pure indium solder and a sacrificial silver layer on the gold surface could be used to inhibit the gold surface 242 from being dissolved without using the indium layer 215. Nevertheless, the lower temperature and measured silver content in the solder provided by indium silver solder wire is preferred.

It is further contemplated that a pre-metallized fiber, such as a gold metallized fiber, could be provided with an overlying indium coating to provide a similar protection of the gold metalization layer of a gold metallized fiber, if desired.

Figure 3:
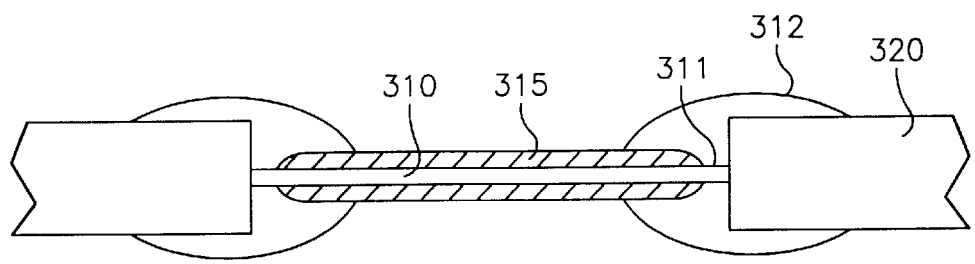
FIG. 3 shows a partial cut away side view of a possible embodiment of a metallized fiber in accordance with some embodiments of the present invention.

Turning to FIG. 3, metalization of the fiber 310 may be performed by applying molten indium onto a glass fiber 310 to form a metalization layer 315. Indium wets to glass, so prior to indium metalization of the fiber 310, the fiber should be cleaned, but no flux should be applied. This is because the flux would remove the surface oxide on the glass that facilitates the adhesion of the indium to the fiber 310.

As discussed above, it is possible to metallize the fiber at an intermediate portion of the cable after that portion of the sleeving has been removed as illustrated in FIG. 3. In such an embodiment, the metalization layer 315 may not always extend under the sleeving 320. A sheath 312, such as epoxy, may be formed to extend over the sleeving 320 and an adjacent portion of the metalization layer 315.

In this embodiment, the sheath 312 seals the interface between the sleeving 320 and the metalization layer 315 and covers a bare surface portion 311 of the fiber 310. Furthermore, it provides rigidity at the interface between the sleeving 320 and the metalization layer 315. As such, in this embodiment, the sheath 312 can help protect against breakage of the fiber at this interface, during installation of a cable into the housing, and during the solder process itself. It also is possible to have epoxy (not shown) secure the sleeving to the housing 205 shown in FIG. 2. This may be done after installation and soldering.

Although FIGS. 1 & 2 illustrate an interior orifice surface surrounding the fiber, some embodiments may have a solder joint used to maintain fibers in a desired position with the housing without soldering to a wall that goes around the fiber. For example, a fiber, or fibers, may have a solder joint with a planar or other non-completely surrounding surface. As such, the solder joint could be formed at other than an entry or an exit to a package.

Figure 4:
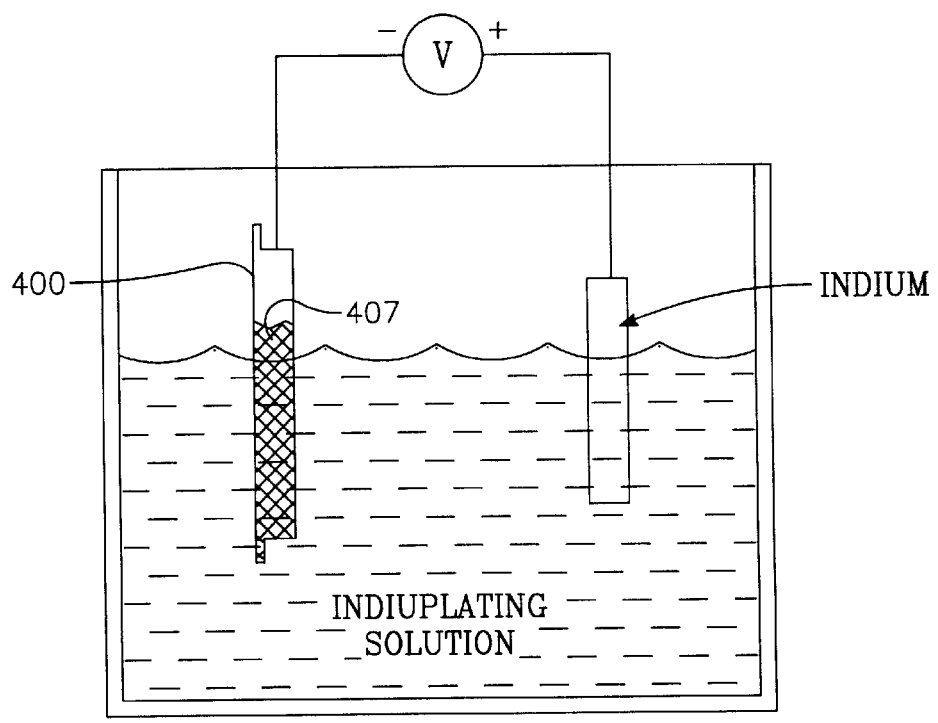
FIG. 4 shows a possible indium plating process in accordance with the present invention.

The indium layer 248 within the ferrule 237 shown in FIG. 2, may be applied with an electrolytic process as illustrated in FIG. 4. A gold plated housing may be selectively coated with XP-2000, available from Pyramid Plastics, Inc., located in Hope, Arkansas, or with other commercially available masking products, to form a mask 407. The masked housing 400 may then be lowered into an indium plating solution, such as a solution of indium sulfamate available from Indium Corp. of America, located in Utica, N.Y. This allows indium plating to occur within the ferrule 237, shown in FIG. 2, without plating the entire surface of the housing 205. Pure indium may be used as the anode with the housing 400 being the cathode as illustrated in FIG. 4.

Typically, the package 400 is not completely submersed in the indium plating solution, but is lowered only enough to submerse the ferrule, multiple ferrules, or other desired solder point. Although shown in FIG. 2 with the indium layer 248 coating only the interior surface 235 of the ferrule 237, the masking and electrolytic application can result in the indium layer 248 coating adjacent portions of the housing outside of the interior surface of the ferrule 237. A 50–70 micron thick indium plating has been found to reduce the gold dissolution rate and provide good wetting property to the molten indium silver solder.

Some embodiments in accordance with the present invention can be used with a variety of optomechanical type switches. A few examples of optomechanical switches are shown in: U.S. patent application Ser. No. 09/063,664, filed on Apr. 20, 1998, by Li Fan, entitled MICROMACHINED OPTOMECHANICAL SWITCHES, now abandoned; and U.S. patent application Ser. No. 09/483,268, filed on Jan. 13, 2000, by Fan, et al., entitled MICROMACHINED OPTO-MECHANICAL SWITCHING DEVICES, both herein incorporated by reference in their entireties. The embodiments of the present invention are not limited to electromechanical optical switches but can be applied to any device coupled to a fiber optic line.

While the preferred methods and embodiments of the present invention have been described in detail above, many changes to these embodiments may be made without departing from the true scope and teachings of the present invention. The present invention, therefore, is limited as claimed below and the equivalents thereof.

What is claimed is:

1. A device capable of receiving an optical fiber comprising:
    a) a housing having an orifice and comprising:
        (i) a substrate material;
        (ii) a gold comprising surface; and
        (iii) an indium layer covering at least a portion of the gold comprising surface;
    b) a fiber extending through the orifice; and
    c) a solder joint formed on the indium layer covering the at least a portion of the gold comprising surface, the solder joint comprising indium silver solder surrounding the fiber and maintaining the fiber in a desired position with the housing.

2. The device of claim 1 wherein the indium silver solder comprises about 5% or less of silver.

3. The device of claim 2 wherein the indium silver solder comprises about 97% or greater of indium and about 3% or less of silver.

4. The device of claim 3 wherein the substrate comprises nickel and iron, and further comprising nickel plating between the substrate and the gold comprising surface.

5. The device of claim 4 wherein the fiber comprises an about 99% indium metalization coating.

6. The device of claim 3 wherein the fiber comprises metalization coating consisting of indium.

7. The device of claim 2 wherein the indium layer covering the at least a portion of the gold comprising surface comprises about 99% indium.

8. The device of claim 7 wherein the gold comprising surface is on a nickel comprising material.

9. The device of claim 1 further comprising the orifice having an associated interior orifice surface, and wherein the gold comprising surface comprises the interior orifice surface, and wherein the indium layer is on the gold comprising interior orifice surface, and wherein the solder joint is within the interior orifice surface surrounding the fiber and forming a hermetic seal within the orifice.

10. The device of claim 9 wherein the indium silver solder comprises about 97% or greater indium and about 3% or less of silver.

11. The device of claim 10 wherein the indium layer on the interior orifice surface comprises about 99% indium.

12. The device of claim 11 wherein the fiber comprises an indium metalization coating.

13. The device of claim 12 wherein the indium metalization coat comprises about 99% indium.

14. The device of claim 9 wherein the indium silver solder consists essentially of about 97% or greater and about 3% or less of silver; and wherein the indium layer on the interior orifice surface consists essentially of indium; and wherein the fiber comprises a indium metalization coating consisting essentially of indium.

15. The device of claim 9 wherein the housing comprises gold plating, and wherein the interior orifice surface comprises indium plating on the gold plating.

16. The device of claim 15 further comprising an intermediate nickel plated layer between the substrate material and the gold comprising interior orifice surface.

17. The device of claim 16 wherein the substrate comprises nickel and iron.

18. The device of claim 17 wherein the substrate comprises about 46% NiFe.

19. The device of claim 9 further comprising:
   a) a sleeving portion surrounding a portion of the fiber; and
   b) an epoxy seal extending over a portion of the sleeving and over a portion of the fiber adjacent the sleeving.

20. The device of claim 19 wherein the fiber comprises an indium metalization coating, and wherein the epoxy seal extends over the indium metalization coating.

21. The device of claim 9 further comprising an array of optomechanical switches secured within the housing.

22. The device of claim 9 wherein the gold comprising interior orifice surface is coated with indium plating so as to be capable of inhibiting a molten indium silver solder for hermetically sealing the orifice from dissolving the gold comprising interior orifice surface.

23. The device of claim 22 further comprising a nickel plating layer between the gold comprising interior orifice surface and the substrate, and wherein the gold comprising interior orifice surface is coated with indium plating so as to be capable of inhibiting a molten indium silver solder from contacting the nickel plating layer.

24. The device of claim 1 wherein the fiber comprises an indium metalization coating.

25. The device of claim 24 wherein the indium metalization coat comprises about 99% indium.

26. The device of claim 1 wherein the indium layer is a sacrificial layer.

27. A package for a device capable of receiving an optical fiber comprising:
   a) a housing having an orifice therethrough, the orifice having an associated interior orifice surface within the orifice, the housing comprising:
      (i) a substrate material; and
      (ii) a gold comprising surface comprising the interior orifice surface; and
   b) an indium layer on the gold comprising interior orifice surface.

28. The package of claim 27 wherein the indium layer consists essentially of indium.

29. The package of claim 28 wherein the indium layer is from about 50 microns to about 70 microns in thickness.

30. The package of claim 29 further comprising an intermediate nickel plated layer between the substrate material and the gold comprising interior orifice surface.

31. The package of claim 30 wherein the substrate comprises nickel and iron.

32. The package of claim 31 wherein the substrate comprises about 46% NiFe.

33. The package of claim 32 wherein the housing comprises gold plating.

34. The package of claim 27 wherein the housing comprises gold plating, and wherein the interior orifice surface comprises indium plating on the gold plating.

35. The package of claim 34 wherein the indium layer is from about 50 microns to about 100 microns in thickness.

36. The package of claim 35 wherein the indium layer is about 70 microns or less in thickness.

37. The package of claim 36 wherein the substrate comprises nickel and iron, and further comprising an intermediate nickel plating layer between the substrate material and the gold comprising surface.

38. The package of claim 34 wherein the gold plating is on a nickel comprising material.

39. The package of claim 27 wherein the substrate comprises nickel and iron, and further comprising an intermediate nickel plating layer on the substrate, and further comprising a gold plating layer on the nickel plating layer.

40. The package of claim 39 wherein the indium layer comprises about 99% indium between about 50 microns to about 70 microns in thickness.

41. The package of claim 27 wherein the indium layer comprises about 99% indium.

42. The package of claim 41 wherein the indium layer is from about 50 microns to about 100 microns in thickness.

43. The package of claim 42 wherein the indium layer is about 70 microns or less in thickness.

44. The package of claim 41 wherein the gold plating is on a nickel comprising material.

45. The package of claim 27 wherein the gold comprising interior orifice surface is coated with indium plating so as to be capable of inhibiting a molten indium silver solder for hermetically sealing the orifice from dissolving the gold comprising interior orifice surface.

46. The package of claim 45 further comprising a nickel plating layer between the gold comprising interior orifice surface and the substrate, and wherein the gold comprising interior orifice surface is coated with indium plating so as to be capable of inhibiting a molten indium silver solder from contacting the nickel plating layer.

47. A device capable of receiving an optical fiber comprising:
   a) a housing comprising a ferrule extending through the housing to form an orifice, the ferrule having an interior surface, the housing comprising
      i) a substrate material comprising nickel and iron;
      ii) a gold plating surface comprising the interior surface;
      iii) a nickel plating layer between the substrate material and the gold plating;
      iv) an indium plating layer on the gold plating of the interior surface, the indium plating layer consisting of about 99% indium and being formed so as to be capable of inhibiting the molten indium silver from contacting the nickel plating layer; and
      v) a top covering the housing; and
   b) a fiber extending through the ferrule, the fiber comprising a metalization coating consisting of about 99% indium; and
   c) a solder joint comprising indium silver solder within the interior surface surrounding the fiber and forming a hermetic seal within the ferrule, the indium silver solder consisting of about 97% or greater indium and about 3% or less of silver so as to be capable of inhibiting a molten indium silver solder from dissolving the gold comprising interior orifice surface.

48. The device of claim 47 further comprising a ribbon cable having an intermediate portion without sleeving, the intermediate portion being disposed within the ferrule, and further comprising two epoxy seals, each seal extending over a portion of the non-sleeved fiber and a portion of the indium metalization coating.

49. The device of claim 48 further comprising an array of optomechanical switches secured within the housing.

50. The device of claim 47 wherein the substrate comprises about 46% NiFe.

51. A device capable of receiving an optical fiber comprising:
   a) a housing having an orifice therethrough, the orifice having an associated interior orifice surface within the orifice, the housing comprising:
      (i) a substrate comprising a nickel comprising surface;
      (ii) a gold comprising surface comprising the interior orifice surface, the gold comprising surface being on the nickel comprising surface; and
      (iii) a layer means on the gold comprising interior orifice surface for inhibiting molten indium comprising solder from dissolving the gold comprising interior orifice surface and contacting the nickel comprising surface;
   b) a fiber extending through the orifice; and
   c) a solder joint comprising indium and silver, the solder joint surrounding the fiber and forming a hermetic seal with the interior orifice surface.

52. A method for fabricating a device capable of receiving an optical fiber, the method comprising:
   a) forming a housing comprising:
      (i) forming a nickel plating on a nickel iron substrate;
      (ii) forming a gold plating on the nickel plating; and
      (iii) plating a portion of the gold plating with indium; and
   b) soldering a fiber to the housing using indium silver solder.

53. The method of claim 52 further comprising metallizing the fiber with indium prior to soldering.

54. The method of claim 53 wherein soldering comprises using an indium silver solder consisting of about 97% or greater of indium and about 3% or less of silver.

55. The method of claim 54 wherein plating a portion of the gold plating comprises forming a plating consisting of indium.

56. The method of claim 55 wherein metallizing the fiber comprises forming a coating consisting of indium.

57. The method of claim 55 wherein plating a portion of the gold plating comprises masking another portion of the gold plating and depositing indium using an electrolytic process.

58. The method of claim 53 wherein forming the housing comprises forming an orifice having an associated interior orifice surface within the orifice, and the portion plated with indium is on the interior orifice surface, and wherein soldering the fiber to the housing comprises forming a solder joint within the interior orifice surface surrounding the fiber and forming a hermetic seal within the orifice.

59. The method of claim 58 wherein plating the interior orifice surface with indium comprises masking a portion of the gold plating and depositing indium using an electrolytic process.

60. The method of claim 59 further comprising metallizing the fiber comprising forming a coating consisting of indium prior to soldering, wherein soldering comprises using an indium silver solder consisting of about 97% or greater of indium and about 3% or less of silver, and wherein plating a portion of the gold plating with indium comprises forming a plating consisting of indium.

* * * * *